United States Patent Office 3,337,325
Patented Aug. 22, 1967

3,337,325
GLASS PRESSING MACHINE
Hans Joachim Bittner and Lorenz Jacobs, Hagen, Westphalia, Germany, assignors to H. Putsch & Comp., Hagen, Westphalia, Germany
Filed Nov. 5, 1963, Ser. No. 322,011
Claims priority, application Germany, Nov. 10, 1962, P 30,550
6 Claims. (Cl. 65—314)

This application is a continuation-in-part of applicants' copending application, Ser. No. 14,409 filed Mar. 11, 1960, and now abandoned.

This invention relates to the molding of glass, and more particularly to a glass pressing machine for forming hollow glass bodies between a mold and a plunger movable into and out of the mold.

When glass bodies such as battery jars and similar hollow articles are molded on presses, it is necessary that the movable plunger be kept in its molding position within the mold cavity until the molded object has cooled sufficiently to be self-supporting and shape-retaining. We have found that internal stresses in the molded article can be greatly reduced or eliminated by relieving the glass body during solidification of external stresses while keeping it enclosed between the mold, the plunger, and a normally annular member which surrounds the plunger and serves as a cover for the mold.

The primary object of the invention, therefore, is the provision of a glass pressing machine which permits the plunger to be forced into a body of glass within the mold at adequate speed to make the molding process economically feasible, then to hold the plunger in the mold without significant pressure being exerted on the molded glass body until the latter solidifies, and finally to withdraw the plunger at relatively great speed.

Another object is the provision of a pressing machine of the type described in which the mold cover is firmly held against the mold during movement of the plunger into the mold, and while the plunger is stationary in the mold cavity.

A more specific object is the provision of means for urging the cover against the mold under adequately high contact pressure without transmitting any portion of this pressure to the plunger.

With these and other objects in view, the invention in one of its aspects resides in a glass pressing machine having two pressure fluid operated motors, each of which may include a cylinder member and a piston member sealingly engaging an internal wall of the cylinder member. The machine further includes a plunger and a mold cover respectively connected to the motors for movement thereby, and two systems of valves connected to a source of pressure fluid and to the two motors so that each of the motors may be actuated independently of the other by pressure fluid. The valve system of one motor is arranged to cause the plunger to be moved under fluid pressure into its molding position in the cavity of a mold held in proper location on the supporting frame of the pressing machine, to cause the plunger to be withdrawn from the mold under fluid pressure, and also to relieve the plunger from pressure exerted by the associated motor while in the molding position. The second motor associated with the cover is controlled by an associated valve system so that it may force the cover into contact with the mold under pressure or may be vented.

The two valve systems are interconnected in such a manner as to permit contact pressure between mold and cover to be generated by the second motor while the plunger is relieved from the pressure of the first motor. A valve actuating mechanism which may include a timer is provided to actuate the valve systems automatically in timed cyclic sequence. In one period of the operating cycle, the plunger is held stationary in its molding position while the cover is firmly pressed against the mold by the fluid pressure acting on the associated motor.

Other features and many of the attendant advantages of this invention will be readily appreciated as the same becomes better understood by reference to the following detailed description when considered in connection with the accompanying drawings wherein.

Figure 1:
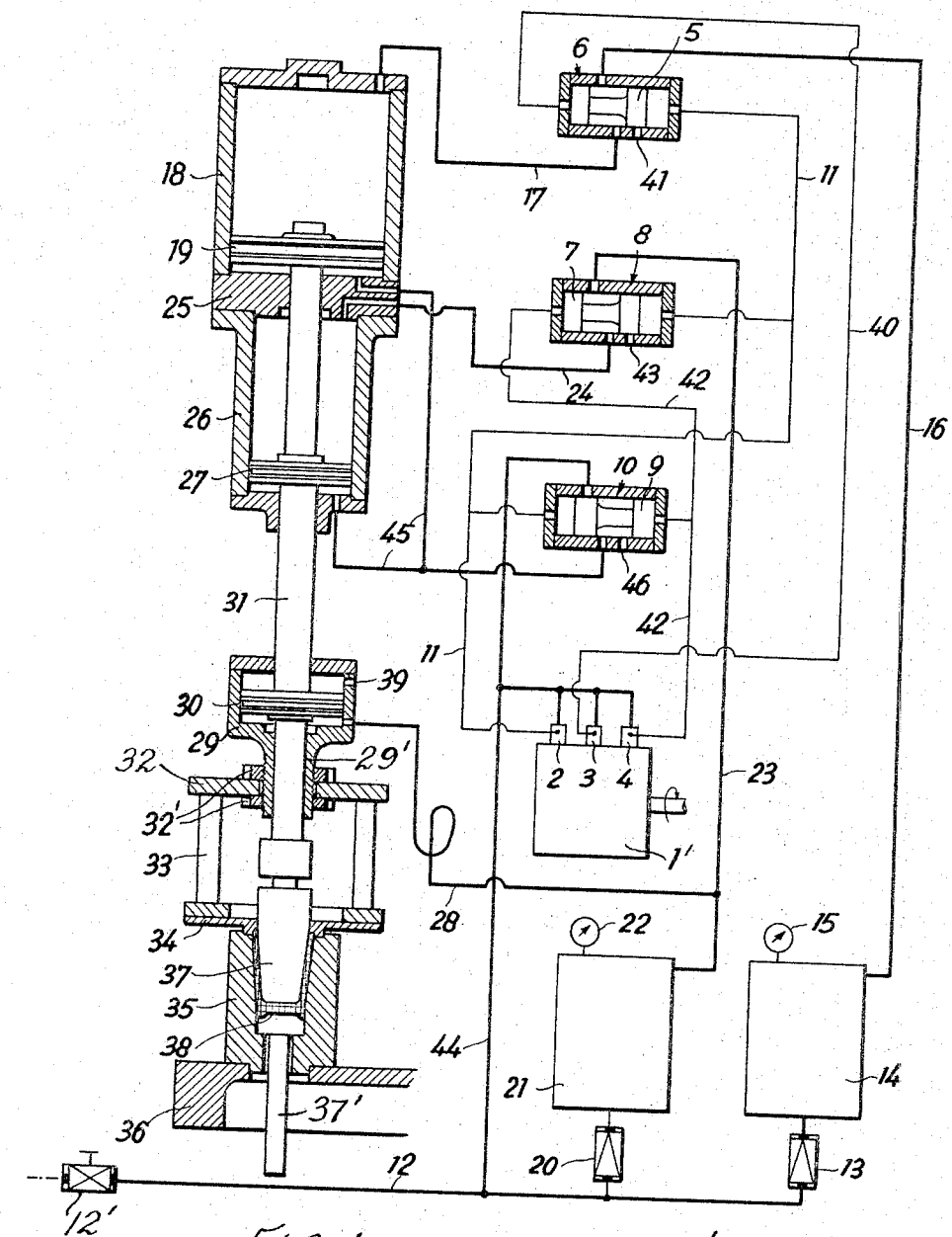
FIG. 1 shows a first embodiment of the invention including a glass press and associated controls, the press being shown in fragmentary elevational section, and the controls in a conventional manner.

Referring now to the drawing in detail and initially to FIG. 1, there is shown a table 36 which is a part of the stationary support structure of the press, not otherwise shown, on which the working elements of the press are mounted. An upwardly open mold 35 is held in a predetermined location on the table 36 by engagement of a cylindrical projection on the mold with a conforming recess in the table.

A glass body 38 is being shaped between the mold 35, a plunger 37 which enters through the open top of the mold, and an ejector 37' which constitutes the bottom of the mold in the operative condition of the apparatus shown in FIG. 1. The ejector 37' has a stem which extends downwardly through the recess in the table 36 and may be actuated in a non-illustrated conventional manner for upwardly lifting the shaped glass body from the mold 35 after completion of the molding cycle.

Vertical movement of the plunger 37 is actuated by a pneumatic motor fixedly attached to the stationary support structure by a horizontal plate 25. The plate is arranged vertically above the location of the mold 35 and carries on its upper side a cylinder 18, and on its underside a cylinder 26 of smaller cross section than the cylinder 18. Pistons 19 and 27 axially movable in the cylinders 18 and 26 respectively are coaxially fastened on a common piston rod or ram 31 which passes in sealing engagement through the plate 25. The lower free end of the ram 31 carries the plunger 37.

A third piston 30 whose cross section is equal to that of the piston 27 is fastened on the ram 31 between the cylinder 26 and the plunger 37. It is axially slidable in a cylinder 29 which is axially movable on the ram 31 in sealing engagement with the ram. A sleeve 29' coaxial and integral with the cylinder 29 extends downward from the cylinder and is externally threaded.

A plate 32 is mounted on the sleeve 29' in axially adjustable position by means of nuts 32' engaging the threads of the sleeve. The plate 32 carries several bars 33 which are spaced about the axis of the ram 31 and extend vertically downward from the plate 32 jointly to support a flat ring 34. In the position of the cylinder 29 illustrated in FIG. 1, the ring 34 constitutes an annular top cover for the mold 35.

Relative movement of the several pistons and cylinders associated with the ram 31 is actuated by compressed air supplied by a main conduit 12 equipped with a shut-off valve 12'. A first pressure reducing valve 13 is interposed between the main conduit 12 and a storage tank 14 equipped with a pressure gage 15. A second pressure reducing valve 20 connects the conduit 12 with a tank 21 having a gage 22.

Admission of compressed air to the cylinders 18 and 26 is controlled by pneumatically operated three-way piston valves 6, 8, and 10. In the position illustrated in the drawing, the piston 5 of the valve 6 is so positioned that a conduit 16 communicating with the tank 14 is connected by the valve 6 with a conduit 17 leading to the space of the cylinder 18 above the piston 19. When the piston 5 is in its other position, the cylinder space is vented to the atmosphere through the conduit 17 and an opening 41 in the valve 6.

The piston 7 of the valve 8 connects a conduit 23 communicating with the tank 21 to a conduit 24 communicating with a space in the cylinder 26 above the piston 27 when the piston 7 is in the illustrated position. When in its other operative position, the piston 7 vents the afore-mentioned cylinder space to the atmosphere through the conduit 24 and a vent opening 43 in the valve 8.

The piston 9 of the valve 10 is shown in a position in which it connects a vent opening 46 of the valve 10 with a conduit 45 communicating with the spaces in the cylinders 18 and 26 under the respective pistons 19 and 27. In its non-illustrated other operative position, the piston 9 connects the conduit 45 to the main pressure conduit 12 through a branch conduit 44.

The space in the cylinder 29 above the piston 30 is permanently vented to the atmosphere by an opening 39, while the space below the piston 30 is permanently connected by a flexible conduit 28 to the tank 21.

The movements of the valve pistons 5, 7, 9 between their operative positions are actuated by brief pulses of compressed air supplied from the main conduit 12 through three three-way valves 2, 3, 4 which are normally closed, and which are opened in timed sequence by a mechanical valve actuator 1. The drive shaft 1' of the actuator 1 is connected to a constant speed gear motor (not shown) in a conventional manner for slow rotation in the direction of the arrow.

The valve 2 is connected by a control conduit 11 with the valves 6, 8, 10 to shift the pistons 5, 7, 9 into the illustrated positions when compressed air is fed to the conduit 11 from the main conduit 12. Movement of the piston 5 into the other position is actuated when the valve 3 is set to admit air through a control conduit 40 to the valve 6. The valves 8 and 10 are jointly shifted away from the illustrated positions by air supplied from the valve 4 through a control conduit 42.

Figure 2:
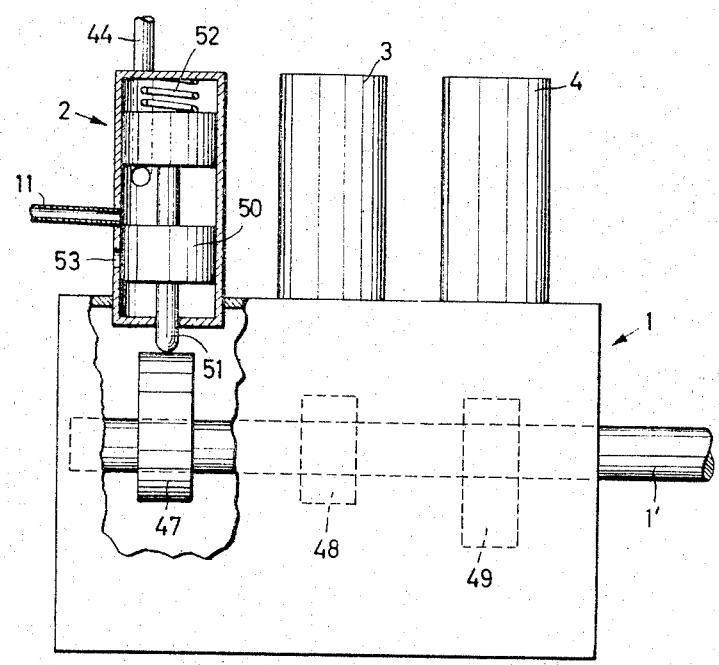
FIG. 2 illustrates a timing arrangement of the apparatus of FIG. 1 in elevation, a portion of a casing being broken away to reveal internal working elements.

As shown in more detail in FIG. 2, the shaft 1' of the mechanical actuator 1 carries three cams 47, 48, 49. The valve 2 is a piston valve similar to the valves 6, 8, 10, but its piston 50 is actuated by the cam 47 which engages a cam follower 51 on the piston 50 and operates against the pressure of a return spring 52. When lifted by the cam 47, the piston 50 connects the control conduit 11 with the branch conduit 44 of the main pressure conduit 12, as seen in FIG. 2. When moved to its normal position by the spring 52, the piston 50 vents the control conduit 11 through an opening 53. The valves 3 and 4 are substantially identical with the valve 2 and alternatingly connect the control conduits 40 and 42 with the branch conduit 44 in a manner not further illustrated when their pistons are lifted by the respective cams 48 and 49, and normally vent the control conduits 40 and 42 to the atmosphere.

The afore-described apparatus is operated as follows:

At the beginning of each press circle, the pistons 19 and 27 are in their respective uppermost positions, and the plunger 37 is upwardly withdrawn from the cavity of the mold 35. The cover ring 34 is lifted above the top of the mold 35 by the piston 30 abutting from below against the radial top wall of the cylinder 29. A glass body may now be deposited in the cavity of the mold 35 in a manner not relevant in itself to the instant invention.

The piston 50 of the valve 2 is lifted by the cam 47 on the rotating shaft 1' into the position shown in FIG. 2, and compressed air is thereby admitted to the valves 6, 8, and 10 to connect the conduit 16 to the upper space of the cylinder 18, and to connect the conduit 23 to the upper space of the cylinder 26, while venting the lower spaces of both cylinders through the conduit 45 and the valve 10. The pressure of the air accumulated in the tank 14 and acting on the large piston 19 drives the plunger 37 downward into the mold 35 to shape the glass body 38. The force exerted by the air from the tank 21 on the piston 27 is balanced or compensated by the force exerted on the piston 30. The cover ring 34 is pressed against the top of the mold 35 under the pressure of the air admitted through the conduit 28 to the cylinder 29 and acting on the lower radial end wall of the cylinder. The forces exerted by the mold 35 on the ring 34 are transmitted, therefore, to the plate 25 and to the remainder of the stationary supporting structure of the press. Because of the balanced pressures in the cylinders 26, 29 the interaction between the ring 34 and the mold 35 does not result in any force which would tend to move the ram 31. Yet, the ram is instrumental in transmitting such force to the machine frame. This arrangement prevents any portion of the contact pressure between the mold 35 and the ring 34 from being transmitted to the plunger 37.

During further rotation of the shaft 1' the valve piston 50 is shifted to block the conduit 44 and to connect the control conduit 11 with the vent opening 53. This does not result in any movement of the pistons 5, 7, 9. It will therefore be appreciated that the period during which the piston 50 of the valve 2 is held in the position illustrated in FIG. 2 may be quite short. Only a momentary pulse of compressed air need be transmitted through the control conduit 11 to shift the valves 6, 8, 10 into the position illustrated in FIG. 1.

The illustrated positions of the valves 6, 8, 10 are maintained for a time sufficient for movement of the piston 19 into the lowermost position of its stroke illustrated in FIG. 1 in which the plunger 37 molds the glass body 38 to the desired shape. At this stage, the piston of the valve 3 is briefly shifted by the cam 48 into a position analogous to that of the piston 50 in FIG. 2, and compressed air at full line pressure is admitted to the valve 6 through the control conduit 40 to shift the piston 5 into the non-illustrated position in which it vents the upper space in the cylinder 18 to the atmosphere through the opening 41. All fluid pressure is thus withdrawn from the piston 19. Since the position of the valves 8 and 10 has not been changed, the fluid pressures exerted on the pistons 27 and 30 still balance each other, and the only force tending to move the plunger 37 downward is derived from the weight of the ram 31 with the pistons 19, 27, and 30, and the plunger 37 mounted thereon. As compared to the fluid pressure required for molding the glass body 38, the weight of the ram 31 and of elements supported thereon is small, particularly when considering the frictional resistance of the seals through which the ram 31 passes in the plate 25 and in the radial faces of the cylinders 26 and 29.

The glass body is thus permitted to cool and to solidify while the presence of the plunger 37 prevents sagging, but without major compressive forces being exerted by the plunger on the glass body 38 which would create internal stresses in the solidified body.

After a period sufficient to make the glass body 38 self-supporting and shape-retaining, the valve 4 briefly connects the control conduit 42 to the main pressure conduit 12 through the branch conduit 44. The compressed air admitted to the valves 8 and 10 shifts the valves to their non-illustrated positions in which the top space of the cylinder 26 is vented through the opening 43 in the valve 8, whereas the bottom space of the cylinder 26 and the bottom space of the cylinder 18 are connected to the main pressure conduit 12 by the valve 10. It will be remembered, that the top space of the cylinder 18 is still vented to the atmosphere by the valve 6, and that the lower space in the cylinder 29 is permanently connected to the tank 21. The three pistons 19, 27, and 30, therefore cooperate rapidly to raise the ram 31, and thereby to remove the plunger 37 and the ring 34 from the mold 35. The apparatus is ready for ejection of the finished glass body 38 from the mold by the ejector 37', for the insertion of a new glass blank into the mold, and for the next molding cycle which starts with a brief lifting of the piston 50 by the cam 47.

Figure 3:
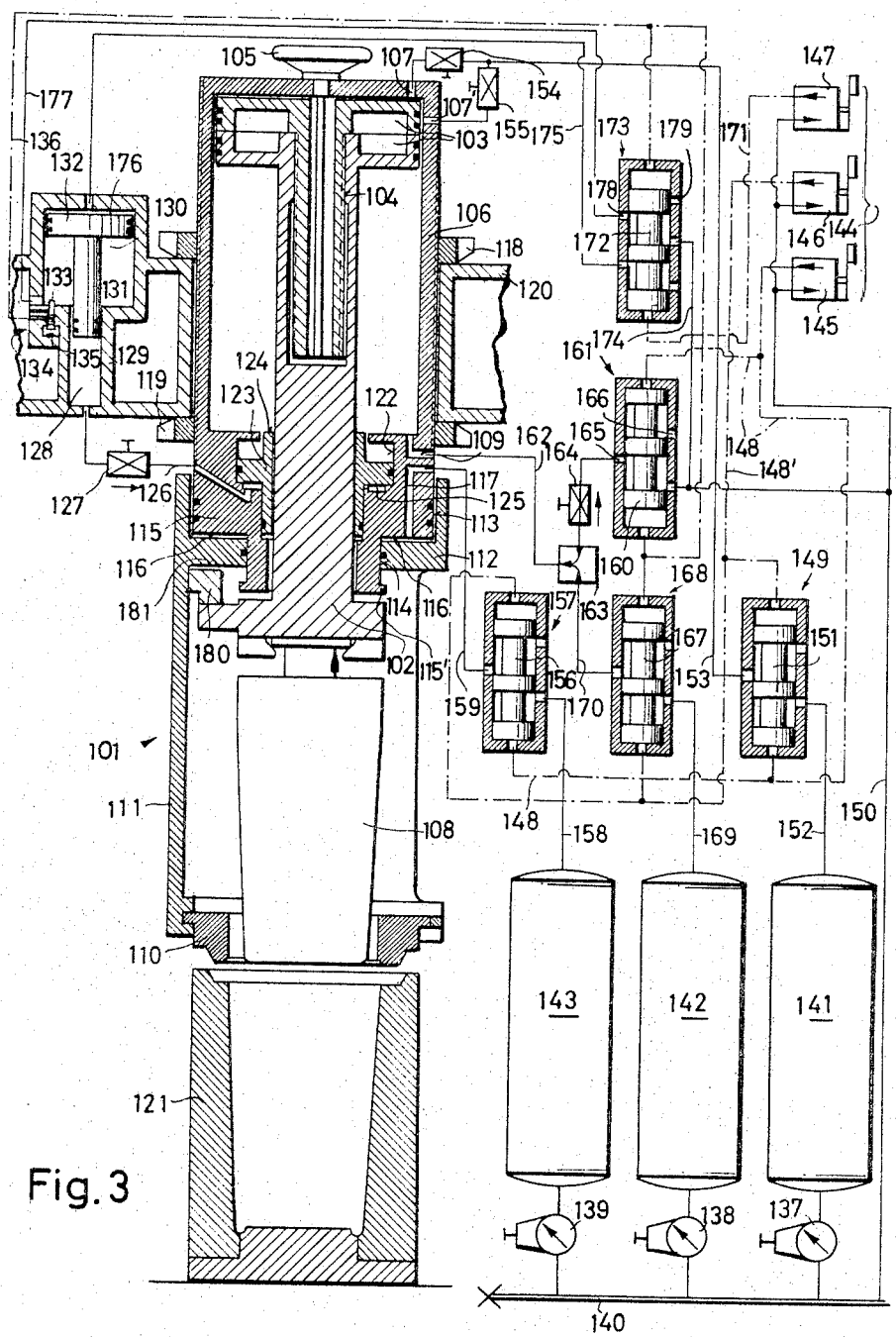
FIG. 3 shows a second embodiment of the invention.

Another embodiment of the invention is illustrated in FIG. 3. It consists mainly of a fluid pressure operated press 101 mounted on a supporting machine frame partly seen at 120, a mold 121 arranged on the frame in a fixed position, and of a control mechanism for actuating the movements of the several parts of the press 101.

The press has a main cylinder 106 in which a piston 103 is vertically movable under the pressure of compressed air which may be admitted to the cylinder space above the piston through an aperture 107 in the radial top wall of the cylinder, and an aperture 107' in the curved cylinder wall slightly below the top wall. Compressed air may be admitted to the cylinder space below the piston 103 through an aperture 109 in the radial bottom wall. The outer curved wall of the cylinder 106 is threaded. Two internally threaded clamping rings 118, 119 secure the cylinder 106 on the frame 120 in axially adjustable fixed position.

The piston 103 is split mainly in a radial plane. The lower portion of the piston is integral with a ram 102. An upwardly open threaded axial cavity in the ram is engaged by a threaded stem 104 of the upper piston portion. The effective axial length of the piston may thus be adjusted by relative threaded movement of the upper piston portion in the ram 102. A handwheel 105 rotatably mounted on the radial top face of the cylinder 106 fixedly carries a key which is secured against rotation in corresponding keyways of the stem 104, but is axially slidable therein, thus permitting adjustment of the piston length by the handwheel 105 without interference with the normal reciprocating movement of the piston.

The substantially solid bottom portion 115 of the cylinder 106 has an upper cylindrical sealing face 113 and a coaxial lower cylindrical sealing face 114 of smaller diameter. The faces 113, 114 engage conforming sealing faces on a cylinder member 112 in such a manner that an annular space 116 between opposite radial faces of the portion 115 and of the member 112 is axially expanded and contracted when the cylinder member 112 moves on the portion 115 between an uppermost position in which the aforementioned opposite radial faces abut against each other, and a lowermost position defined by abutment of the member 112 against an annular projection 115' on the portion 115. A conduit 117 leads outward from the space 116 through the bottom portion 115.

An internal recess 122 in the bottom portion 115 receives a sleeve 124 which is axially slidable toward and away from the illustrated position in which the top face of the sleeve 124 is flush with the inner radial face at the bottom of the cylinder 106. The sleeve 124 carries an integral piston disk 123 which sealingly engages an axial cylindrical wall of the recess 122, thereby separating an annular space 125 below the disk 123 from the remainder of the cavity in the cylinder 106. When the sleeve 124 is in the illustrated position, the lower piston face of the disk 123 in the space 125 is substantially smaller than the upper piston face of the disk exposed to the fluid in the cylinder 106.

A conduit 126 equipped with a throttle valve 127 connects the space 125 with a cylindrical space 128 of a stepped cylinder 129 in which a plunger 131 is axially movable. The space 128, the conduit 126, and the annular space 125 are normally filled with hydraulic fluid. The cylinder 129 is fixedly mounted on the machine frame 120. A piston disk 132 fixedly attached to the plunger 131 divides an enlarged portion of the cylinder 129 into a space 130 below the disk 132 and a space 176 above the disk 132. The stem 133 of a valve 134 projects from the bottom of the cylinder space 130. When the disk 132 in its downward travel abuts against the stem 133, it opens the valve 134 and thereby connects a duct 135 to a conduit 136. The duct 135 is permanently connected with the main compressed air conduit of the machine in a manner not further illustrated.

A bracket 111 integral with the cylinder member 112 extends downward therefrom and carries an annular member 110 which constitutes the cover of the mold 121 when the cylinder member 112 is lowered from the illustrated position. An abutment 180 projecting from the ram 102 is arranged opposite a downwardly directed face of the cylinder member 112, whereby the ram entrains the cover 110 during its upward movement. A plunger 108 projects downward from the ram 102 toward the mold 121.

The press is operated by means of compressed air supplied by a pressure pipe 140 which communicates with three storage tanks 141, 142, 143, through respective pressure reducing valves 137, 138, 139. The valves are equipped with pressure gages. A main air conduit 150 connected to the pressure pipe 140 supplies air at full-line pressure where needed.

Air is distributed to the several pneumatically operated elements of the press 101 by means of pneumatically operated multi-wave valves. A three-way valve 157 having a piston 156 is connected to the conduit 117 by a conduit 159 for venting the space 116 when the valve is in the illustrated position and for connecting the space 116 to the tank 143 through pipe 158 in the non-illustrated operating position of the valve.

A three-way valve 168 having a piston 167 is connected to the aperture 109 of the cylinder 106 by conduits 162, 170 and a T fitting 163. When in its non-illustrated position, the piston 167 connects the aperture 109 to the air storage tank 142 through conduit 169.

A three-way valve 149 having a piston 151 is shown to vent the upper space or compartment of the cylinder 106 through the aperture 107, a throttle valve 154 and a conduit 153. When the piston 151 is shifted in the other position it connects the upper space of the cylinder 106 to the air storage tank 141 through a conduit 152. As downward movement of the piston 103 is thereby started, the piston uncovers the aperture 107' in the curved wall of the cylinder 106 and thereby provides an additional path between the upper cylinder space and the conduit 153 through a throttle valve 155 which is normally set for a larger flow section than that of the throttle valve 154.

A three-way valve 161 having a piston 160 is permanently connected with the afore-mentioned T fitting 163 through an opening 165 in the valve 161 and a throttle valve 164. In the illustrated position of the piston 160 the opening 165 is connected with a conduit 174 which communicates with the main air conduit 150 and with an opening in the five-way valve 173 which will presently be described in more detail. In the non-illustrated operating position of the piston 160, the opening 165 is connected with a vent 166 of the valve 161 communicating with the atmosphere.

The five-way valve 173 has a piston 172. One section of the valve 173 connects the upper space 176 in the cylinder 129 through the conduit 175 to the atmosphere when the piston 172 is in the illustrated position, and otherwise admits compressed air at full line pressure from the afore-mentioned conduit 174 to the space 176. The other section of the five-way valve 173 has an opening 178 which communicates with the space 130 in the cylinder 129 through a conduit 177, and is connected to conduit 174 in the illustrated position of the piston 172. When the piston is shifted, the opening 178 is connected to a vent opening 179.

The movements of the several valve pistons are controlled in timed sequence by an arrangement similar to that shown in FIG. 2, and diagrammatically illustrated in FIG. 3. The timing mechanism includes three cam operated three-way valves 145, 146, 147 which are arranged to emit brief pulses of compressed air to control conduits 148, 148′, and 171 when acted upon by a rotating cam mechanism merely represented by the bracket 144, and vent the control conduits when not acted upon by the cam mechanism, as has been described in more detail with reference to the similar structure shown in FIG. 2. The valves 145, 146, 147 are connected to the main air conduit 150.

The apparatus is illustrated in FIG. 3 in its condition prior to the start of a molding cycle. It operates as follows:

When the control valve 145 is briefly actuated, and a pulse of compressed air is emitted into the control conduit 148, the pistons of the valve 149, 157, and 161 are shifted. Compressed air is thereby admitted from the tank 141 to the space of the cylinder 106 above the piston 103, initially at a low rate through the throttle 154, and then more rapidly through the throttle 155. The plunger 108 is forced into the plastic glass blank (not shown) in the mold 121. At the same time, air is admitted from the tank 143 into the space 116, and the annular cover 110 is positioned on the mold 121 under fluid pressure. The space in the main cylinder 106 under the piston 103 is vented through the valve 161.

After completion of the molding stroke of the ram 102, the control valve 146 is energized to emit a pulse of compressed air into the control conduit 148′ which is connected to the valves 149, 157, and 168. The valves 149 and 157 are thereby returned to their illustrated condition, and the piston 167 of the valve 168 is moved to the non-illustrated position. The space above the piston 103 and the space 116 are vented to the atmosphere. The plunger 108 and the cover 110 rest on the molded glass body under their own weight. The weight of the plunger 108 and of structures connected therewith may be balanced, however, to any desired degree by air admitted to the aperture 109 from the tank 142 through the valve 168. The pressure prevailing in the cylinder 106 under the piston 103 can be adjusted quite precisely by the throttle valve 164 which connects the T fitting 163 to the atmosphere, and more coarsely by setting the reducing valve 138. The cover 110 is held down firmly by its own weight and that of the bracket 111.

At a time selected to permit adequate solidification of the molded glass piece, a pulse of compressed air is emitted by the control valve 147 through the conduit 171 to the five-way valve 173. The conduit 177 leading to the space 130 is disconnected from the line pressure in the conduit 174 and vented to the opening 179. The space 176, previously vented, is connected to the line pressure in the conduit 174. The resulting downward movement of the disk 132 and the plunger 131 forces hydraulic fluid into the annular space 125 under the disk 123 and raises the sleeve 124 above the level of the bottom in the cylinder 106. The piston 103 and the attached plunger 108 are thereby raised slightly at a very slow rate which may be controlled by the throttle valve 127. Damage to the molded glass piece by hasty withdraw of the plunger is thus avoided.

When the initial slow withdraw of the plunger 108 has progressed to an adequate extent, the disk 132 opens the valve 134 by means of the stem 133 and compressed air at full line pressure is admitted from the duct 135 to the valves 173, 161, and 168 to return their pistons 172, 160, and 167 to the illustrated position. The disk 132 and the plunger 131 are thereby returned to the position shown in FIG. 3. The piston 103 is returned toward the upper terminal position of its stroke by air admitted to the aperture 109 from the valve 161, and the tank 142 is shut off by the valve 168. As the piston 103 approaches the illustrated position, it obstructs the aperture 107′ and its movement is slowed by the residual cushion of air in the cylinder the escape of which is restricted by the throttle 154. At about the same time, the abutment 180 engages the face 181 of the member 112 and lifts the cover 110 from the mold 121. The apparatus is again in the position shown in FIG. 3 and ready for the next molding cycle.

Figure 4:
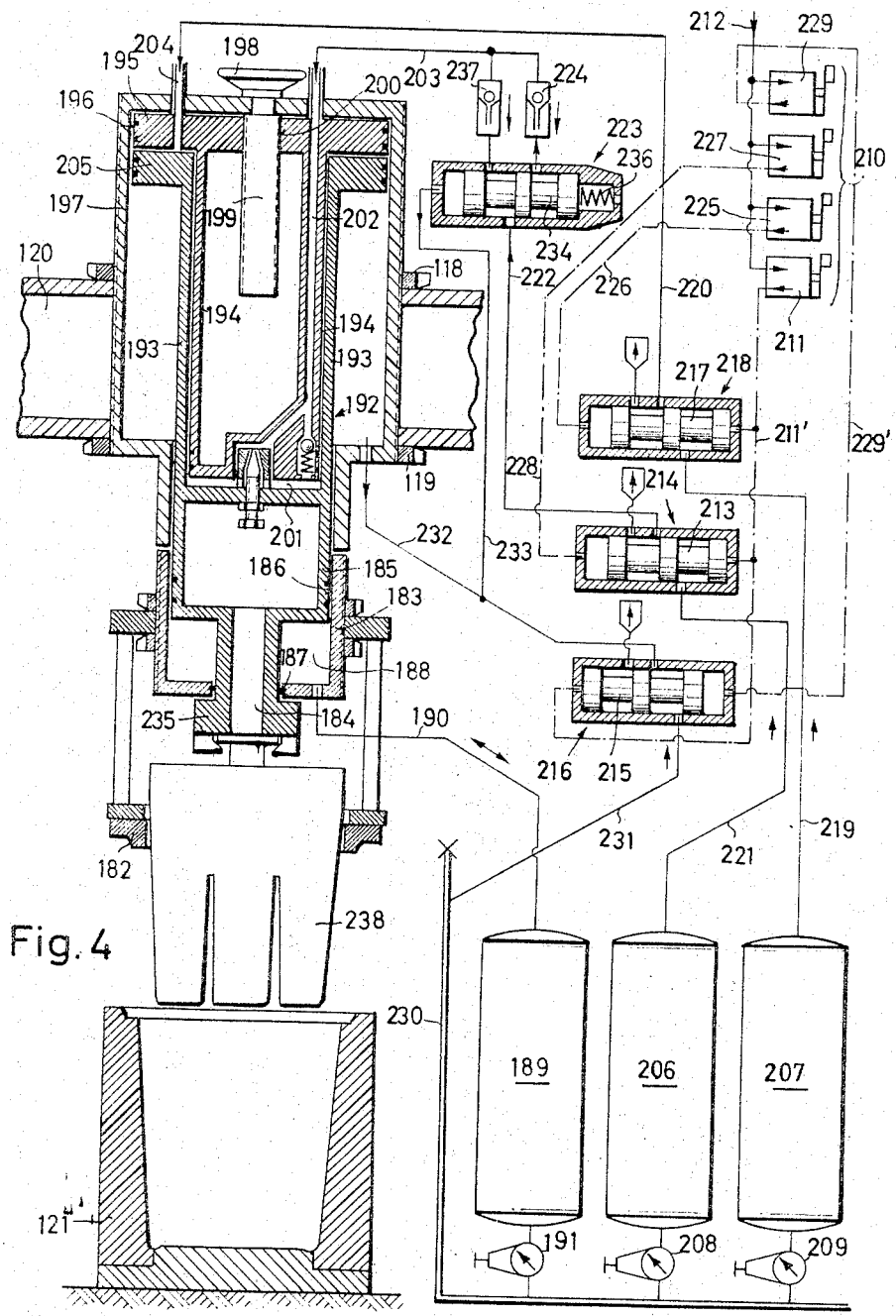
FIG. 4 shows a third embodiment, the views of FIGS. 3 and 4 corresponding to that of FIG. 1.

The glass pressing machine whose essential operating elements are illustrated in FIG. 4 is similar to the aforedescribed devices in that it includes a pneumatically operated press mounted on a support structure 120 by means of clamping rings 118, 119, and cooperates with a mold 121. The mold is covered during the molding operation by an annular cover 182 adjustably supported on a cylinder 183 which is axially slidable on a ram 184 toward and away from an abutment 235. The ram is integral with the bottom portion 185 of a piston rod 192. A sealing face 186 on the bottom portion 185, and a sealing face 187 on the ram 184 cooperate with the cylinder 183 to define a pressure space 188 permanently connected with a compressed air tank 189 by a conduit 190. The tank communicates with a compressed air line 230 through a pressure reducing valve 191. Similar tanks 206 and 207 are connected to the line 230 by means of valves 208 and 209.

The upper portion 193 of the piston rod 192 is hollow and carries an annular main piston 205. The axial cavity of the upper piston rod portion 193 slidably receives an elongated cylindrical guide body 194 fixedly fastened to a disk 195 which is interposed between the main piston 205 and the radial top face of a main cylinder 197 fixedly fastened in an adjustable manner on the machine frame 120 by the rings 118 and 119.

A handwheel 198 is fixedly attached to a threaded spindle 199 and is rotatable on the top wall of the cylinder 197. The spindle engages a threaded axial bore 200 in the disk 195 which is secured against rotation in a manner not further illustrated. Rotation of the handwheel 198 thus permits the disk 196 to be axially shifted, whereby the axial stroke of the piston 205 is adjusted. The cylinder space between the piston 205 and the disk 195 is sealed by gaskets 196 on the disk 195. A conduit 204 extends from this space outward of the cylinder 197.

The lower radial face of the guide body 194 and an opposite top face of the bottom portion 185 define therebetween a pressure space 201 which communicates with a conduit 202 in the body 194.

The conduit 202 is connected by another conduit 203 with two throttle valves 224 and 237.

The movements of the ram 184 and of the cover ring 182 are energized by compressed air admitted through a valve system which includes four three-way valves 214, 216, 218, and 223, and four pulse generating control valves 211, 225, 237, and 229 substantially identical with the several valves shown in FIG. 2, and actuated in timed sequence by a common cam drive diagrammatically indicated in FIG. 4 at 210. The pulse generating valves are supplied with compressed air at full line pressure by an air line 212 connected to the compressed air line 230 in a manner not further shown.

In the position illustrated, the piston 234 of the valve 223 connects the throttle valve 237 with a conduit 222. When the piston 134 is shifted to its other position by a biasing spring 236, the conduit 222 is connected to the throttle valve 224. The piston 213 of the valve 214 is shown to vent the conduit 222, and connects the conduit to the tank 206 through a conduit 221 in its other operative position.

The valve 216 connects the branch conduit 231 of the main air line 230 with the pressure space in the cylinder 197 under the piston 205 through a conduit 232, and similarly provides full line pressure through a conduit 233 to the valve 223 to hold the piston 234 in the indicated position against the pressure of the spring 236. When the piston 215 is shifted into its non-illustrated position, the conduits 232 and 233 are vented to the atmosphere.

The valve 218 communicates with the conduit 204 through a conduit 220 and vents the space in the cylinder 197 between the disk 195 and the piston 205. When in its non-illustrated operative position, the piston 217 of the valve 218 connects the conduit 220 to a conduit 219 communicating with the tank 207.

The pulse generating control valve 211 is connected by a control conduit 211' to the valves 214, 216, and 218. The control valve 225 is connected to the valve 218 by a control conduit 226. The pulse generating control valve 227 is connected to the valve 214 by a control conduit 228, and the control valve 229 communicates with the control valve 216 through a control conduit 229'.

The afore-described apparatus operates as follows:

In the illustrated position of the piston 205, a plunger 238 attached to the ram 284 and the mold cover 182 are held above the cavity of the mold 221 by air supplied at line pressure to the underside of the piston 205. The cover 182 is held in its raised position by engagement of the cylinder 183 with the abutment 235.

After a body of glass has been introduced into the mold 121, the molding cycle is started by a pulse of compressed air generated by the control valve 211 which simultaneously shifts the valves 214, 216, and 218 into their non-illustrated positions. Venting of the conduit 233 also causes the piston 234 of the valve 223 to be shifted by the return spring 236. Air is admitted from the tank 207 by the valve 218 and the conduit 204 into the cylinder space above the piston 205.

Simultaneously the space in the cylinder 197 under the piston 205 is vented to the atmosphere through the valve 216, and the piston 205 is moved downward, forcing the plunger 238 into the mold 221. Compressed air is admitted to the pressure space 201 through the valves 214 and 223 at a slow rate controlled by the relatively small flow section of the valve 224 from the tank 206. The pressure reducing valves 191 and 208 are adjusted in such a manner that the upward pressure of the air in the pressure space 188 on the piston rod portion 185 balances the weight of the piston 105, of the plunger 238, of the connecting elements, and also the downward pressure in the pressure space 201. Entry of the plunger 238 into the molten glass in the mold 121 is thus energized entirely by the air acting from above on the piston 205, and is not influenced by any contact pressure which develops between the cover 182 and the mold 121. The upward component of this pressure is transmitted in the space 201 to the guide body 194 which is a portion of the stationary machine structure.

At a time selected to coincide with the end of the downward stroke of the plunger 238, the control valve 225 generates a brief pulse of compressed air in the control conduit 226 which returns the piston 217 of the valve 218 to the illustrative position. The space between the disk 195 and the piston 205 is vented to the atmosphere, and all fluid pressure is thereby removed from the plunger 238 except for the difference in the pressures in the spaces 188 and 201 which balances the weight of the piston 205, of the plunger 238, and of the elements connecting them. The cover 182 remains in contact with the mold 221 under the pressure of the air in the space 188.

After a time sufficient to permit adequate solidification of the molded glass body in the mold 221, the control valve 227 emits a pulse which returns the valve 214 to the illustrated position. The space 201 is thereby vented at the slow rate determined by the small flow section of the throttling valve 224. The pressure in the space 188 thus gradually prevails over the pressure in the space 201 combined with the weight of the ram assembly, and the piston 205 very slowly starts an upward movement which disengages the plunger 283 from the molded glass body in the mold 221.

The control valve 229 utlimately emits a pulse of compressed air into the control conduit 229' which returns the valves 216 and 223 to the illustrated positions. Air at full line pressure is admitted to the cylinder 197 below the piston 205, and the venting of the pressure space 201 is facilitated by opening of a flow path through the throttle valve 237 of relatively large flow section as the piston 234 of the valve 233 moves back into its initial position. The press is quickly restored to its starting condition.

It is a common feature of the several embodiments of the invention described hereinabove that the plunger is free of fluid pressure generated by forces which would tend to move it inward of the mold, and thereby to exert substantial pressure on a molded glass object while the same is solidifying. The internal stresses which would result from such pressure are therefor absent in glass piece molded on presses of this invention.

The glass presses illustrated in FIGS. 3 and 4 further permit the weight of the ram and of other structural elements associated with the plunger to be balanced, whereby the molded glass body is not even under the stresses exerted by the plunger weight. It will be appreciated that the embodiment of the invention shown in FIG. 1 is capable of the modification required to make it operate in the same manner, and such modification will be obvious to those skilled in the art in view of the showing of FIGS. 3 and 4.

The provision of separate fluid operated motors for actuating movement of the plunger and movement of the cover ring relative to the plunger permits the cover to be held against the top of the mold under fluid pressure where the weight of the cover and of associated structural elements is not sufficient to provide holding force. FIG. 3 illustrates a press of the invention in which the weight of the cover and of a supporting bracket is mainly relied upon for holding the cover on the mold during solidification of a glass body which is not even subjected to the weight of the inserted plunger, and such holding force is adequate. If the weight of the plunger were not fully balanced, fluid pressure could readily be supplied to hold the cover ring in place in the manner shown in FIGS. 1 and 4. The necessary modification of the valve system will be evident to the workers in this field.

It should be understood, therefore, that the foregoing disclosure relates only to preferred embodiments of the invention, and that it is intended to cover all changes and modifications of the examples of the invention herein chosen for the purpose of the disclosure which do not constitute departures from the spirit and scope of the invention set forth in the appended claims.

What is claimed is:

1. In a glass pressing machine having a support (120); a mold (121) defining a cavity therein; first fluid-operated motor means having a cylinder portion (106) and a piston portion (103) slidable in the cylinder portion and dividing the same into two vertically offset compartments, one portion of the motor means being mounted on said support and the other portion carrying a plunger (108) for movement of the plunger inward and outward of the mold cavity during operation of the motor; a first source of fluid under pressure; a first valve system (149, 161) interposed between said source and said compartments; and a cover member (110); the improvement comprising:
   (a) valve means in said first valve system for simultaneously venting said compartments;
   (b) second fluid operated motor means (112, 115, 116) mounted on said support;
   (c) a second valve system (157) interposed between second motor means and said source for controlling admission of said fluid to said second motor means,
      (1) said second motor means being connected to said cover member for moving the cover member relative to the plunger and for urging the cover member toward a position of abutting engagement with said mold under the pressure of the admitted fluid, the cover member bounding the cavity in said position thereof;
   (d) balancing means for balancing the weight of said plunger, said balancing means including a second source (142) of fluid under pressure lower than the pressure of the fluid of said first source, and balancing valve means (168, 164) connected to said second source and to the lower one of said compartment for admitting fluid to the latter; and (e) operating means for operating said valve means and said balancing means in timed sequence.

2. In a machine as set forth in claim 1, said operating means including a timing mechanism.

3. In a machine as set forth in claim 1, one of said members of said first motor means being fixedly mounted on said support.

4. In a machine as set forth in claim 3, said second motor means having a portion (115) secured in fixed spatial relationship to said support, and another portion (112) connected to said cover member.

5. In a machine as set forth in claim 1, pressure-fluid operated means (123–136, 173) for moving said plunger outward of said mold while said compartments are simultaneously vented by the valve means of said first valve system.

6. In a machine as set forth in claim 5, said moving means including a pressure fluid operated motor (123, 125) and additional valve means (173) interposed between one of said sources and said moving means for controlling supply of fluid to the same; said operating means including timing means (144) connected to said valve systems, said balancing means, and said additional valve means for operating the same in timed sequence.

References Cited

UNITED STATES PATENTS

| | | | |
|---|---|---|---|
| 2,011,980 | 8/1935 | Miller | 65—314 |
| 3,185,560 | 5/1965 | Wilcock | 65—314 |

DONALL H. SYLVESTER, *Primary Examiner.*

D. CRUPAIN, G. R. MYERS, *Assistant Examiners.*